United States Patent [19]

Tingley

[11] Patent Number: 5,697,084
[45] Date of Patent: Dec. 9, 1997

[54] REDUCING MULTIPATH FADING USING ADAPTIVE FILTERING

[75] Inventor: Robert D. Tingley, Hudson, Mass.

[73] Assignee: Bose Corporation, Framingham, Mass.

[21] Appl. No.: 307,300

[22] Filed: Sep. 16, 1994

[51] Int. Cl.$^6$ .................................................. H04B 1/06
[52] U.S. Cl. .................................... 455/276.1; 455/278.1; 455/307
[58] Field of Search .................................. 455/135, 137, 455/273, 276.1, 278.1, 296, 306, 307, 52.1, 52.3; 375/347, 349

[56] References Cited

U.S. PATENT DOCUMENTS

| | | |
|---|---|---|
| 3,633,107 | 1/1972 | Brady . |
| 3,879,664 | 4/1975 | Monsen ........................ 375/347 |
| 4,112,370 | 9/1978 | Monsen ........................ 375/347 |
| 4,328,585 | 5/1982 | Monsen ........................ 375/343 |
| 5,031,193 | 7/1991 | Atkinson et al. ............ 375/343 |
| 5,265,122 | 11/1993 | Rasky et al. ............. 455/276.1 |
| 5,319,677 | 6/1994 | Kim . |
| 5,361,400 | 11/1994 | Kazecki et al. ............ 455/296 |

FOREIGN PATENT DOCUMENTS

| | | |
|---|---|---|
| 449327 | 10/1991 | European Pat. Off. . |
| WO 93/19526 | 9/1993 | WIPO . |

OTHER PUBLICATIONS

Reinhard, "An Adaptive Array for Interference Rejection in a Coded Communication System", May 1972, pp.1-10.
European Patent Office Search Report dated Dec. 19, 1995 on Application 95306449.0, 3 pages.

*Primary Examiner*—Edward F. Urban
*Attorney, Agent, or Firm*—Fish & Richardson P.C.

[57] ABSTRACT

A receiver reduces multipath fading by receiving a transmitted signal at two antennas and adaptively filtering each received signal separately. The adaptively filtered received signals are then combined to produce a combined signal that is used to control the adaptive filtering of each received signal.

26 Claims, 3 Drawing Sheets

REDUCING MULTIPATH FADING USING ADAPTIVE FILTERING

BACKGROUND OF THE INVENTION

This invention relates to reducing multipath fading in a received signal.

Multipath fading is a major source of signal quality degradation in FM reception. Fading often occurs when a transmitted signal follows multiple paths to a receiver, as a result of the transmitted signal reflecting off buildings, aggressive terrain, and other obstacles. The reflections cause multiple copies of the transmitted signal to reach the receiver, each arriving at a different time. As a result, the multiple received versions of the transmitted signal may interfere destructively at the receiver, causing the signal quality to degrade.

Multipath fading may be modeled by a channel that produces a distorted received signal from an input transmitted signal. When the coherence bandwidth (the reciprocal of the length of the impulse response) of the multipath channel becomes smaller than the bandwidth of the input transmitted signal, the channel attenuates different frequencies of the transmitted signal differently to produce the received signal, i.e., the received signal exhibits frequency-selective fading. When multipath fading is severe, the received signal may disappear completely at certain frequencies, creating nulls in the frequency spectrum of the signal.

Some receivers compensate for multipath fading by employing space diversity techniques in which multiple, spatially separated antennas are used. These systems exploit the fact that the signals received by the multiple antennas experience uncorrelated fading when the antennas are separated by a sufficient distance.

In one type of system, referred to generally as a switched diversity system, the receiver simultaneously assesses the quality of each of the received signals from the multiple antennas. The quality of the signal may be based on signal power, or signal to noise ratio. The receiver then selects the higher quality signal as the receiver's input. In another more elaborate diversity system, described in "FM-Receiver with Adaptive Antenna", H. Bockmann and K. Wiedemann, SAE Technical Paper Series 900250, 1990, the receiver combines the received signals of four antennas in such a way that their sum has minimal envelope distortion. This system outperforms the two antenna switched diversity system but generally requires the use of two additional antennas.

SUMMARY OF THE INVENTION

In general, in one aspect, the invention features reducing multipath fading in a receiver by receiving a transmitted signal at two antennas before adaptively filtering each received signal separately. The received signals are then combined to produce a combined signal that is used to control the adaptive filtering of each received signal.

Preferred embodiments of the invention may include the following features. Each received signal is downconverted, low pass filtered and digitized before being adaptively filtered. The adaptive filtering is performed in the digital domain by estimating tap coefficients that minimize a cost function. The cost function measures how far the amplitude of the combined signal departs from a reference amplitude. Tap coefficients of the adaptive filters are adjusted using the method of steepest descent to minimize the cost function. The cost function employs a scaling factor between one and ten percent of the reference amplitude.

In addition, the received signals at each antenna correspond to the transmitted signal after the transmitted signal has passed through a channel. The adaptive filtering inverts a baseband equivalent of each channel to produce an estimate of the transmitted signal. The adaptive filters may modify a rate at which they adapt to the received signal in response to a change in power of the received signal. In addition, a second received signal in a frequency band adjacent to that of the first received signal may be detected, and the rate at which the adaptive filters function may be modified in response to a difference in amplitude between the first and second received signals. This helps prevent the adaptation noise of the filters from increasing when the signal to noise ratio of the transmitted signal is high.

In general, in another aspect, the invention features a receiver front end for reducing multipath fading. The receiver front end comprises two input lines each receiving a signal from a separate antenna. The signal received at each antenna corresponds to a transmitted signal that has passed through a channel.

A filter circuit receives the signal from a first antenna to produce a filtered signal. The filter circuit has an adaptive filter approximating the inverse of the baseband equivalent of the channel over which the signal arrives at the first antenna. Another filter circuit receives the signal from a second antenna to produce a second filtered signal. An adaptive filter in the second filter circuit approximates the inverse of the channel over which the signal arrives at the second antenna. A combiner circuit sums the filtered signals from the filter circuits to produce a combined signal. The adaptive filters in each filter circuit are each adaptively adjusted to achieve a combined signal having a predetermined characteristic.

Preferred embodiments of the invention may include the following features. Each input line in the receiver front end has a downconverter shifting the corresponding received signal before filtering the signal in a low pass filter. Each resulting low pass filtered signal is then digitized in an analog to digital converter before being filtered by a respective adaptive filter. Each adaptive filter may comprise a digital, linear filter that estimates an inverse of the baseband equivalent of the channel over which the signal arrives at the antenna.

In addition, the receiver may include a control processor that measures a change in power of the received signal, and controls a rate at which the adaptive filters adapt to the received signal in response to the detected change. The control processor may also measure the amplitude of a second received signal in a frequency band adjacent the first received signal, and it may cause the adaptive filters to modify the rate at which they converge in response to a difference in amplitude of the first and second received signals.

Among the advantages of the invention are the following.

The invention provides a receiver with rapid filter adaptation that quickly compensates for time-varying multipath attenuation in a received signal. In particular, each adaptive filter converges in about 1 ms. Because the Doppler frequency (indicating the rate of change of the channel) of a 100 MHZ carrier is about 10 Hz at expressway speeds, the filters closely track the fluctuations found in mobile radio channels.

The receiver reduces multipath fading in a manner to outperform any existing diversity system, by using only two antennas.

Other advantages and features of the invention will become apparent from the following description and from the claims.

DESCRIPTION

Figure 1:
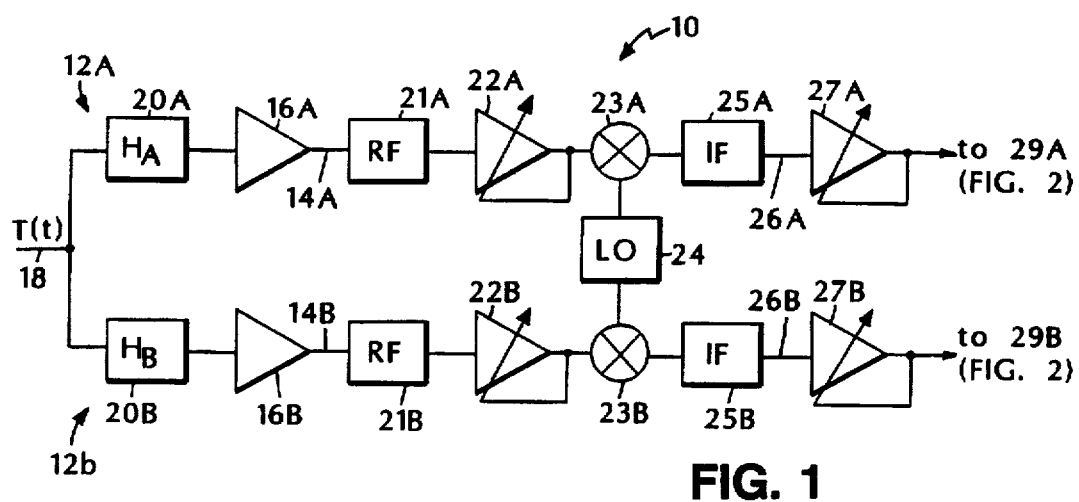
FIGS. 1 and 2 are schematic block diagrams of a receiver.
Figure 2:
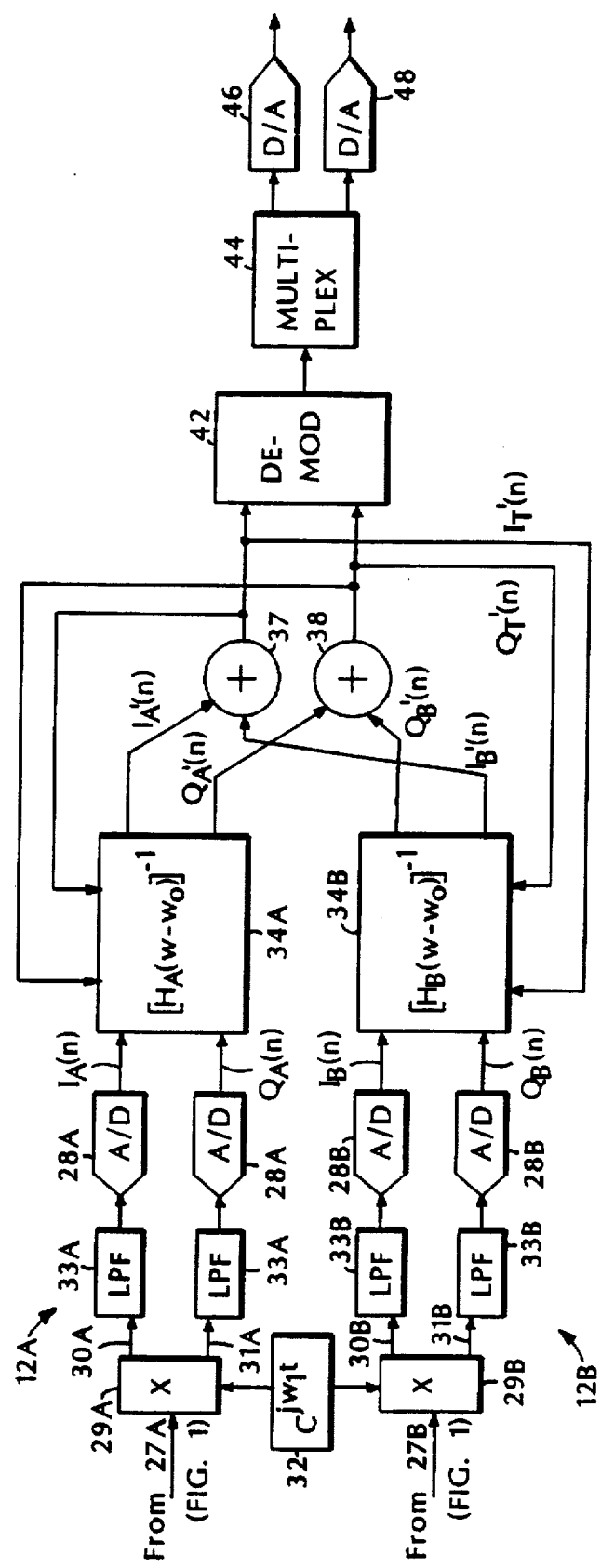

Referring to FIGS. 1 and 2, a receiver 10 in accordance with the invention has two identically constructed front end circuits 12A and 12B. Front end circuit 12A processes a received FM radio signal 14A from a first antenna 16A, and front end circuit 12B processes a received FM radio signal 14B from a second antenna 16B, which is spatially separated from first antenna 16A.

Each received signal 14A, 14B is equal to a transmitted signal T(t) 18 times the transfer function (i.e., frequency response) of the channel 20A, 20B over which it is transmitted. In the subsequent discussion, channels associated with the first and second antennas are referred to as channels A and B, respectively, and the transfer functions of channels A and B are designated $H_A$ and $H_B$, respectively. Because the antennas are spatially separated, $H_A$ and $H_B$ are likely to be different. For example, one channel may exhibit more multipath fading than the other channel.

In front end circuit 12A, the received signal 14A passes through a bandpass filter 21A centered at the RF frequency of the bandlimited FM signal of interest in the received signal 14A, i.e. the FM signal to which the receiver is being tuned. The passband of the bandpass filter 21A is wide compared to the bandwidth of the FM signal. The amplitude of the filtered FM signal is then adjusted in an automatic gain control (AGC) circuit 22A before being downconverted in a mixer 23A to an intermediate frequency governed by a local oscillator 24. The resulting downconverted FM signal passes through a second bandpass filter 25A, which is centered at the intermediate frequency and has a passband equal to a bandwidth of the FM signal. The bandpass filters 21A, 25A together increase the signal to noise ratio of the FM signal 26A while attenuating all other transmissions in the received signal 14A. The amplitude of the FM signal 26A is then adjusted in a second automatic gain control circuit 27A.

The AGC circuits 22A, 27A each contain a full wave rectifier and a low pass filter that produce an absolute value of their input signals as a function of time. The AGC circuits together adjust their gain to deliver a constant high signal level $R_{ref}$ to A/D converters 28A at a later stage in the receiver. This improves the signal to noise ratio and permits the use of low cost, lower resolution A/D converters.

The FM signal next passes into a complex downconverter 29A that performs a standard form of complex downconversion to produce a baseband in-phase signal 30A and a baseband quadrature signal 31A, each centered at a frequency governed by a complex local oscillator 32 (producing a signal of the form $e^{j\omega_1 t}$). The quadrature and in-phase signals each pass through an identical low-pass filter (LPF) 33A before each signal is digitized in an analog-to-digital (A/D) converter 28A. The low-pass filters 33A remove high frequencies from the signals and thereby prevent aliasing in the converters, in addition to attenuating adjacent interference that has survived the previous low pass filters 21A and 25A.

The converters produce a digitized in-phase signal $I_A(n)$ and a digitized quadrature signal $Q_A(n)$, where n is a sample number. Both the in-phase signal and the quadrature signal pass into a digital adaptive filter 34A. The adaptive filter estimates the inverse of the baseband equivalent frequency response $([H_A(\omega-\omega_0)]^{-1}$, where $\omega_0$ is the sum of the local oscillator frequency and the complex local oscillator frequency $\omega_1$) of the "A" channel (i.e., the channel over which the received signal was transmitted). The filter applies the inverse to the received signal to produce a more uniform overall transfer function for the channel and circuit 12A, and to thus reduce multipath fading in the receiver. The output of filter 34A is an adaptively filtered in-phase signal $I_A'(n)$ and a filtered quadrature signal $Q_A'(n)$.

The other front end circuit 12B processes its received signal in the same way as front end circuit 12A to generate an adaptively filtered in-phase signal $I_B'(n)$ and an adaptively filtered quadrature signal $Q_B'(n)$. Adaptive filter 34B in front end circuit 12B estimates the inverse of the baseband equivalent transfer function for the B channel (i.e., $[H_B(\omega-\omega_0)]^{-1}$,) and it applies this to the B channel received signal to reduce the multipath fading. In FIG. 1, components of front end circuit 12B that correspond to the components of front end circuit 12A are identified by the same numbers followed by a "B".

As indicated in FIG. 2, an identical signal from local oscillator 24 is used to shift the received signals 14A, 14B in both front end circuits to the intermediate frequency. If separate local oscillators are used for each front end circuit, they are "slaved". Similarly, an identical signal from each complex oscillator 32 is used to downconvert the signals in each front end circuit to baseband. This ensures that the baseband signals in each front end circuit are centered at the same frequency.

The receiver adds the in-phase signals $I_A'(n)$, $I_B'(n)$ from each adaptive filter 34A, 34B in an adder 37 to produce a combined in-phase signal $I_T'(n)$. A second adder 38 adds the quadrature signals $Q_A'(n)$, $Q_B'(n)$ from the adaptive filters to produce a combined quadrature signal $Q_T'(n)$. The combined quadrature and in-phase signals are sent to an FM demodulator 42, a stereo multiplex decoder 44 and digital-to-analog converters 46 that are connected in a standard stereo FM receiver fashion. The combined signals $I_T'(n)$, $Q_T'(n)$ are also fed back to each adaptive filter 34A, 34B to control the inverse channel estimation in each filter, as described in more detail below.

Because channel 20A is independent of channel 20B, noise that is introduced by channel 20A into received signal 14A tends to be uncorrelated with the noise that is introduced by channel 20B into received signal 14B. The signal components in each received signal, however, are highly correlated. Thus, when adders 37, 38 add the filtered signals, the correlated signal components reinforce one another to a greater extent than the uncorrelated noise components, causing a 3 dB gain in signal to noise ratio of the combined signals $I_T'(n)$, $Q_T'(n)$.

The adaptive filter 34A is a linear, causal filter having seven complex adjustable taps $a_{Ak}=c_{Ak}+jd_{Ak}$, k=0, 1, 2, ... 6, where $c_{Ak}$ are the real components of $a_{Ak}$, and $d_{Ak}$ are the imaginary components of $c_{Ak}$. The adaptive filter 34B is an identical filter having adjustable tap coefficients $a_{Bk}=c_{Bk}+jd_{Bk}$, k=0, 1, 2, ... 6. The filters 34A and 34B produce the in-phase signals $I_A'(n)$, $I_B'(n)$, respectively, by convolving the outputs $I_A(n)$, $I_B(n)$, $Q_A(n)$, $Q_B(n)$ of the A/D converters as follows:

$$I_A'(n) = \sum_{k=0}^{k-1} [I_A(n-k)c_{Ak} - Q_A(n-k)d_{Ak}] \quad (1)$$

$$I_B'(n) = \sum_{k=0}^{k-1} [I_B(n-k)c_{Bk} - Q_B(n-k)d_{Bk}] \quad (2)$$

The quadrature components $Q_A'$, $Q_B'$ are produced by the filters 34A, 34B as:

$$Q_A'(n) = \sum_{k=0}^{k-1} [I_A(n-k)d_{Ak} + Q_A(n-k)c_{Ak}] \quad (3)$$

$$Q_B'(n) = \sum_{k=0}^{k-1} [I_B(n-k)d_{Bk} + Q_B(n-k)c_{Bk}] \quad (4)$$

Multipath fading introduces amplitude variations into the constant amplitude (FM) transmitted signal T(t) 18. Filters 34A, 34B choose tap coefficients to minimize the amplitude variation in the combined signals $I_T'(n)$, $Q_T'(n)$ and thereby reduce the multipath fading distortion in the combined signals.

Both of the adaptive filters employ a cost function that is a measure of the variation in the amplitude of the combined signals $I_T'(n)$, $Q_T'(n)$. In the described embodiment, the cost function is defined as:

$$\begin{aligned} J(n) &= [I_T'(n)^2 + Q_T'(n)^2 - R_{ref}]^2 \\ &= [(I_A'(n) + I_B'(n))^2 + (Q_A'(n) + Q_B'(n))^2 - R_{ref}]^2 \end{aligned}$$

where $R_{ref}$ is equal to a reference amplitude used by the AGC circuit within the downconverter.

Figure 3:
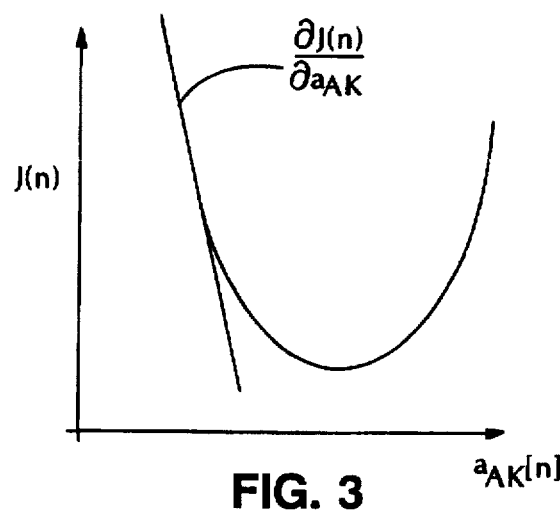
FIG. 3 is a graph of a projection of a cost function.

Substituting Equations (1) through (4) into the expression for J(n), it can be seen that J(n) is a function of the components $c_{Ak}$, $d_{Ak}$, $c_{Bk}$, $d_{Bk}$ of the tap coefficients within the adaptive filters. Referring to FIG. 3, J(n) as a function of any one component of the tap coefficients has several local minima (one of which is shown). The local minima are related by rotational transformations and thus they have equal amplitude.

Each filter optimizes its respective tap coefficients independently by using the method of steepest descent. In this method, the adaptive filters find successive estimates of the components of its respective tap coefficients that decrease the value of J(n). After several sample periods, the adaptive filters produce a set of tap coefficients that yields a value of J(n) that is near a local minimum. The precise change in the value of any given tap coefficient from one sample period (n) to the next (n+1) is determined from the instantaneous partial derivative of J(n) with respect to a component of the tap coefficients, as follows:

$$c_{Ak}(n+1) = c_{Ak}(n) - \mu \frac{\partial J(n)}{\partial c_{Ak}(n)}, \quad (5)$$

where $\mu$ is a constant between 1% to 10% of $R_{ref}$, k is fixed, and $$\begin{aligned} \frac{\partial J(n)}{\partial c_{Ak}(n)} &= 2[I_T'^2 + Q_T'^2 - R_{ref}] \frac{\partial}{\partial c_{Ak}(n)} [I_T'^2 + Q_T'^2 - R_{ref}] \quad (6) \\ &= 2[I_T'^2 + Q_T'^2 - R_{ref}] [2 I_T'(n) \partial I_T'(n)/\partial c_{Ak}(n) + \\ &\quad 2 Q_T'(n) \partial Q_T'(n)/\partial c_{Ak}(n)] \\ &= 2[I_T'^2 + Q_T'^2 - R_{ref}] [2 I_T'(n) I_A(n-k) + \\ &\quad 2 Q_T'(n) Q_A(n-k)] \\ &= 4[I_T'(n)^2 + Q_T'(n)^2 - R_{ref}] [I_T'(n) I_A(n-k) + \\ &\quad Q_T'(n) Q_A(n-k)] \end{aligned}$$

Similarly, $$d_{Ak}(n+1) = d_{Ak}(n) - \frac{\mu \partial J(n)}{\partial d_{Ak}(n)}, \text{ where} \quad (7)$$

$$\frac{\partial J(n)}{\partial b_{Ak}(n)} = 4[I_T'(n)^2 + Q_T'(n)^2 - R_{ref}] [-I_T'(n) Q_A(n-k) + Q_T'(n) I_A(n-k)] \quad (8)$$

The tap coefficients $c_{Bk}(n)$, $d_{Bk}(n)$ of adaptive filter 34B are computed in an analogous way, i.e. $c_{Bk}(n+1)$ and $d_{Bk}(n+1)$ are obtained by replacing the subscripts "A" in Equations (5) through (8) with the subscripts "B".

The adaptive filters start their processing using a set of tap coefficients $\{a_{Ak}(O)\}$ and $\{a_{Bk}(O)\}$ that are initialized to some initial value. It is not critical what the initial values are, because they do not strongly affect the rate at which the subsequent computations will converge. Thus, for example, the values can be randomly selected within some preselected range or they can all be set to zero.

After receiving a first output $I_A(O)$, $Q_A(O)$ ($I_B(O)$, $Q_B(O)$) from the A/D converters, the filters 34A (34B) produce an output by substituting the initialized tap coefficients in Equations (1) through (4). After receiving a first value $I_T'(n)$, $Q_T'(n)$ (n=0) from adders 37, 38, the filters calculate new tap coefficient components $c_{Ak}(n+1)$, $d_{Ak}(n+1)$ ($c_{Bk}(n+1)$, $d_{Bk}(n+1)$) according to Equations (5) through (8). In the next sample period, the filters each produce a new output $I_A'(n+1)$, $Q_A'(n+1)$ ($I_B'(n+1)$, $Q_B'(n+1)$) by substituting the new tap coefficient components in Equations (1) through (4). The process repeats itself for all subsequent samples received from the A/D converters. Thus, each adaptive filter is continuously adjusting its tap coefficients to compensate for changes in the transfer function of the channels 20A, 20B (FIG. 1).

Note that the factor $\mu$ controls the rate at which the tap coefficients converge on the global minimum of the cost function. A larger value for $\mu$ results in faster convergence and a smaller value for $\mu$ results in slower convergence. Thus, it is desirable to set $\mu$ to a high value. However, if its value is set too high, oscillations may result. The optimum value for $\mu$ can be determined empirically by simply increasing it until oscillations occur and then backing off slightly.

Though $\mu$ controls the rate of convergence, it is really the characteristics of the channel itself which fundamentally determines how fast the algorithm will converge. Experience indicates, however, that convergence times of between 0.5 and 1.0 msec are readily obtainable.

When the signal to noise (SNR) ratio of the transmitted signal 18 (FIG. 1) at the antenna is low (for example, when the power of the transmitted signal at the carrier frequency of the FM signal 26A, 26B of interest is low, or when interference from signals in frequency bands adjacent to the frequency of interest is high), the adaptive filters 34A, 34B may begin to adapt to and reinforce the noise, instead of the FM signal. This will cause the filters 34A, 34B to further decrease the SNR, i.e., noise pumping may occur. The resulting erroneous output of the adaptive filters takes the form of "adaptation noise" that corrupts the output of the receiver 10. In extreme cases, the noise pumping and adaptation noise may become intense enough to be audible.

The adaptive filters may be prevented from adapting (or converging) to the noise, instead of to the received FM signal, in the presence of low SNR by monitoring the received signals 14A, 14B for variations in signal strength. When the signal strength drops below a threshold, the adaptive filters adapt more slowly to changes in the FM signal 26A, 26B. This prevents the adaptive filters from adapting to and reinforcing the rapidly changing noise profile.

Figure 4:
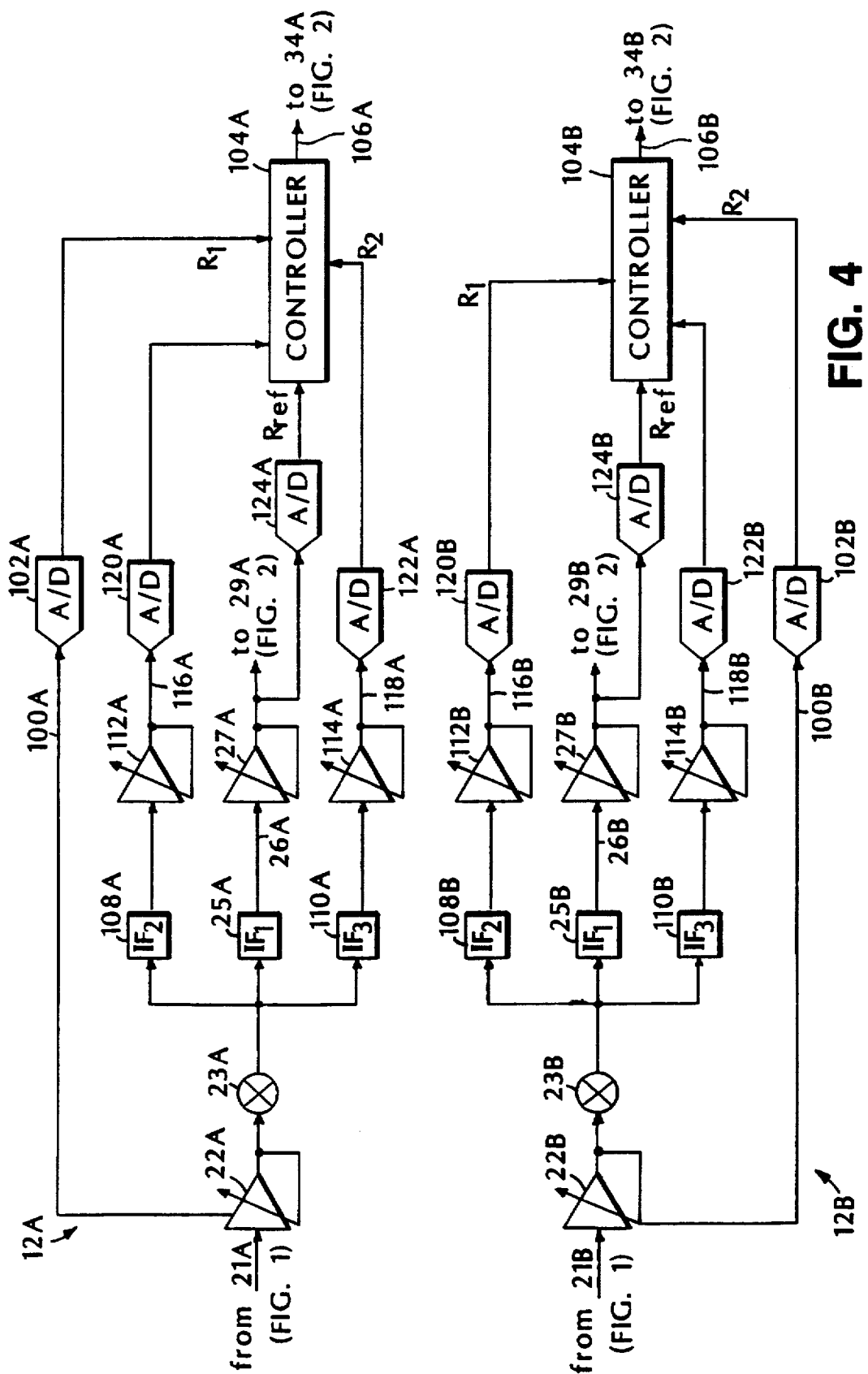
FIG. 4 is a block diagram of another embodiment of the receiver of FIG. 1.

Referring to FIG. 4, the signal strength of each received signal 14A, 14B is monitored separately in half-circuits 12A, 12B, respectively, in an identical manner. In half-circuit 12A, AGC 22A produces a control signal 100A, indicating how the gain is adjusted in response to changes in the signal strength of the filtered received signal 14A. The control signal is digitized in an A/D converter 102A before being sent to a digital control processor 104A connected to adaptive filter 34A. A high control signal indicates to the control processor 104A that the received signal strength has decreased. When the control signal exceeds a threshold, the control processor provides a signal 106A that causes the adaptive filter 34A to decrease its rate of convergence by decreasing the factor $\mu$ employed in the method of steepest descent. For example, in response to one unit of increase of the control signal 100A above the threshold, the adaptive filter 34A decreases $\mu$ by a preset amount. The filter 34A continues to decrease $\mu$ in response to further increases in the control signal 100A. In an extreme case, $\mu$ is made so small that the filter 34A effectively provides no multipath compensation, and the received signal is sent to adders 37, 38 without further processing. When the control signal 100A begins to decrease, the filter 34A increases $\mu$ to resume filtering the FM signal.

Figure 5:
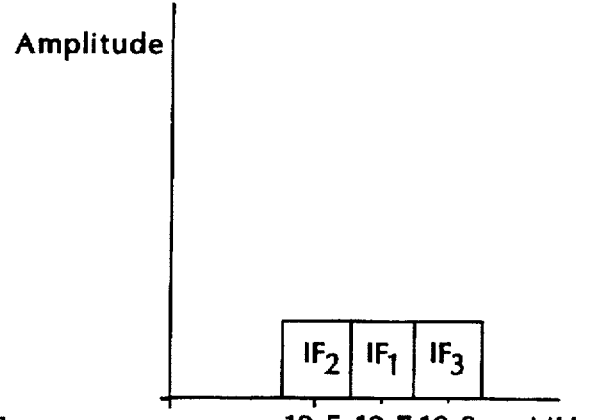
FIG. 5 is a graph of the frequency response of filters in the receiver of FIG. 4.

Referring also to FIG. 5, adjacent signal interference is tracked by two intermediate frequency filters ($IF_1$, $IF_2$) 108A, 110A. The IF filters 108A, 110A are centered at opposite carrier frequencies adjacent to the carrier frequency of the FM signal of interest, and the bandwidth of each IF filter 108A, 110A is equal to the bandwidth of the FM signal 26A. For example, if the IF filter (IF1) 25A is centered at a carrier frequency of 10.7 MHz, filters 108A and 110A are centered at 10.5 MHz and 10.9 MHz, respectively. An AGC 112A, 114A following each IF filter 108A, 110A produces an output ($R_1$, $R_2$) 116A, 118A that is indicative of the amplitude of the signal in each adjacent band. Each output 116A, 118A is digitized in an A/D converter 120A, 122B before arriving at the control processor 104A. The control processor 104A also receives the signal $R_{ref}$ from AGC 27A (digitized by A/D converter 124A) that indicates the amplitude of the FM signal 26A of interest. When the processor detects that either $R_1$ or $R_2$ is equal to or greater than $R_{ref}$, the processor 104A determines that adjacent band interference is high, and the processor 104A causes the adaptive filter 34A to reduce $\mu$, to avoid adapting to and reinforcing the rapid changes in the signal caused by the interference. This is accomplished by progressively decreasing or increasing $\mu$ in response to the difference between $R_1$ or $R_2$ and $R_{ref}$ in a manner analogous to that described above.

The receiver is thus able to reduce audible adaptation noise and noise pumping effects in the receiver output. In addition, by removing multipath attenuation in the combined signals, the adaptive filters effectively increase the power of the combined signals in the direction of a source of the transmitted signal T(t), i.e. the receiver has a directed polar pattern. The adaptive filters also remove frequency nulls to provide a constant power frequency response in the receiver.

In one specific embodiment of the receiver described above, bandpass filters 21A, 21B have a passband of approximately 5 MHz, and local oscillators 23A, 23B each downconvert the received signals 14A, 14B to an intermediate frequency of 10.7 MHz (FIG. 1). Each bandpass filter 25A, 25B is thus centered at 10.7 MHz, with a passband equal to the band allotted each FM signal, e.g. a few hundred kilohertz. Each complex downconverter 29A, 29B produces baseband signal 30A, 31A and 30B, 31B that are centered at DC.

In addition, each AGC circuit 22A, 22B, 27A, 27B has a time constant of approximately 10 ms, and provides a 50 dB gain, to produce a 100 dB overall gain for the receiver. The low pass filters 33A, 33B each have a cut-off frequency of 112.5 kHz for the A/D converters 28A, 28B sampling the filtered signal at 225 kHz. The adaptive filters 34A, 34B are each about 35 µs wide (i.e., 7/{225 kHz}), which is larger than the typical maximum delay spread of each channel 20A, 20B (where the delay spread is the time spanned by the impulse response of the channel). This allows each adaptive filter to correctly invert the full frequency response of channels 20A, 20B.

Other embodiments are within the following claims. For example, in an alternative steepest descent algorithm, each filter computes the instantaneous partial derivative of the cost function with respect to a component of each tap coefficient by incrementing the values of $c_{Ak}$, $d_{Ak}$ ($c_{Bk}$, $d_{Bk}$) by a small preselected amount $\Delta$. The value of $\Delta$ is empirically adjusted to ensure a fast convergence of the tap coefficients. Each filter 34A (34B) then recomputes J(n) from Equations 1 and 2 (3 and 4) by holding contributions of the other filter to the signals $I_T'(n)$, $Q_T'(n)$ constant. This generates a new value $J(n)_{new}$ for the cost function. The instantaneous derivatives are then computed using the following equations:

$$\frac{\partial J(n)}{\partial c_{Ak}} = \frac{J(n)_{new} - J(n)}{c_{Ak}(n) + \Delta - c_{Ak}(n)} \qquad (9)$$

$$\frac{\partial J(n)}{\partial c_{Ak}} = \frac{\partial J(n)}{\partial c_{Bk}} = \frac{\partial J(n)}{\partial d_{Ak}} = \frac{\partial J(n)}{\partial d_{Bk}} = \frac{J(n)_{new} - J(n)}{\Delta}$$

where k is held constant.

The filter then computes an estimate for the next value of each tap coefficient $c_{Ak}(n+1)$, $d_{Ak}(n+1)$ ($c_{Bk}(n+1)$, $d_{Bk}(n+1)$) by substituting Equations (9) into Equations (5) and (7).

After new values are computed for each tap coefficient in this way, the new values $c_{Ak}(n+1)$, $d_{Ak}(n+1)$ ($c_{Bk}(n+1)$, $d_{Bk}(n+1)$) are used in the adaptive filter for the next sample period. The filters then repeat the process for each subsequent sample period.

In this algorithm, the factor $\mu/\Delta$ controls the rate at which the process converges.

In other embodiments, the adaptive filters may be adapted based on a training signal broadcast to the receiver together with the FM transmission. The adaptive filters may employ an algorithm other than the method of steepest descent to minimize the cost function. Additional receiving antennas and input lines may be added to the system to further improve performance, and the adaptive filters may estimate the inverse of the multipath channels using more than seven complex taps.

In addition, a single AGC circuit providing a 100 dB gain may be used in place of each pair of 50 dB AGC circuits 22A, 27A and 22B, 27B.

I claim:

1. A method for reducing multipath fading in a receiver that receives a transmitted signal, said method comprising:
   receiving the transmitted signal through a first antenna to generate a first received signal;
   receiving the transmitted signal through a second antenna to generate a second received signal;
   downconverting the first received signal to provide a downconverted first received signal;
   downconverting the second received signal to provide a downconverted second received signal;
   low pass filtering the downconverted first received signal to provide a low-pass filtered downconverted first received signal;
   low pass filtering the downconverted second received signal to provide a low-pass filtered downconverted second received signal;
   adaptively filtering the low-pass filtered downconverted first received signal to provide a first adaptively filtered signal;
   adaptively filtering the low-pass filtered downconverted second received signal to provide a second adaptively filtered signal;
   combining the first and second adaptively filtered signals to produce a combined signal; and
   using the combined signal to control the adaptive filtering of both the low-pass filtered downconverted first and second received signals.

2. The method of claim 1 further comprising digitizing the low-pass filtered downconverted first received signal prior to adaptively filtering the low-pass filtered downconverted first received signal.

3. The method of claim 2 further comprising digitizing the low-pass filtered downconverted second received signal prior to adaptively filtering the low-pass filtered downconverted second received signal.

4. The method of claim 2 wherein adaptively filtering comprises estimating a tap coefficient of a digital filter.

5. A method for reducing multipath fading in a receiver that receives a transmitted signal comprising,
   receiving the transmitted signal through a first antenna to generate a first received signal;
   receiving the transmitted signal through a second antenna to generate a second received signal;
   adaptively filtering a signal related to the first received signal to provide a first adaptively filtered signal;
   adaptively filtering a signal related to the second received signal to provide a second adaptively filtered signal;
   combining the first and second adaptively filtered signals to produce a combined signal;
   controlling the adaptively filtering of both signals related to the first and second received signals with the combined signal;
   wherein said first and second received signals represent the transmitted signal after having passed through first and second channels characterized by a first channel frequency response and a second channel frequency response respectively,
   and wherein adaptively filtering the signals related to the first and second received signals comprises estimating an inverse of the equivalent of the first channel frequency response and an inverse of the equivalent of the second channel frequency response.

6. A method for reducing multipath fading in a receiver that receives a transmitted signal comprising,
   receiving the transmitted signal through a first antenna to generate a first received signal;
   receiving the transmitted signal through a second antenna to generate a second received signal;
   adaptively filtering a signal related to the first received signal to provide a first adaptively filtered signal;
   adaptively filtering a signal related to the second received signal to provide a second adaptively filtered signal;
   combining the first and second adaptively filtered signals to produce a combined signal;
   controlling the adaptively filtering of both signals related to the first and second received signals with the combined signal;
   modifying a rate at which adaptive filtering adapts to the signals related to the received signals,
   and detecting a change in power in a received signal,
   said modifying a rate comprising changing the rate of adaptation of the filtering in response to the change in power.

7. A method for reducing multipath fading in a receiver that receives a transmitted signal comprising,
   receiving the transmitted signal through a first antenna to generate a first received signal;
   receiving the transmitted signal through a second antenna to generate a second received signal;
   adaptively filtering a signal related to the first received signal to provide a first adaptively filtered signal;
   adaptively filtering a signal related to the received signal to provide a second adaptively filtered signal;
   combining the first and second adaptively filtered signals to produce a combined signal;
   controlling the adaptively filtering of both signals related to the first and second received signals with the combined signal;
   modifying a rate at which the adaptive filtering adapts to the received signal;
   detecting the second received signal occupying a frequency band adjacent to the first received signal,
   said modifying a rate comprising changing the rate of adaptation of the filtering in response to a difference in amplitude of the second received signal and the first received signal.

8. A receiver front end for reducing multipath fading comprising:
   a first input line receiving a first received signal from a first antenna, said first received signal representing a transmit signal that has passed through a first channel characterized by a first channel frequency response;
   a first filter circuit receiving the first received signal and producing a first filtered signal therefrom, said first filter circuit comprising a first adaptive filter characterized by an inverse first channel frequency response which approximates an inverse of the equivalent of the first channel frequency response;
   a second input line for receiving a second received signal from a second antenna, said second received signal representing the transmit signal after it has passed through a second channel characterized by a second channel frequency response;
   a second filter circuit receiving the second received signal and producing a second filtered signal therefrom, said second filter circuit comprising a second adaptive filter characterized by an inverse second channel frequency response which approximates an inverse of the equivalent of the second channel frequency response;

a combiner circuit summing the first and second filtered signals to generate a combined signal;

wherein the first and second adaptive filters each contain adjusting means for adaptively adjusting the first and second adaptive filters in response to the combined signal to achieve a combined signal having a predetermined characteristic.

9. The receiver front end of claim 8 wherein said first filter circuit comprises a downconverter downconverting the first received signal to produce a first baseband signal, said first adaptive filter being connected to receive the first baseband signal.

10. The receiver front end of claim 9 wherein said second filter circuit comprises a second downconverter downconverting the second received signal to produce a second baseband signal, said second adaptive filter being connected to receive the second baseband signal.

11. The receiver front end of claim 9 wherein said first adaptive filter approximates an inverse of a baseband equivalent of said first channel.

12. The receiver front end of claim 8 wherein the first filter circuit comprises a first analog-to-digital converter digitizing the first received signal to produce a first sampled signal, the first adaptive filter being connected to receive the first sampled signal.

13. The receiver front end of claim 12 wherein the first adaptive filter comprises a digital filter.

14. The receiver front end of claim 12 wherein the second filter circuit comprises a second analog-to-digital converter digitizing the second received signal to produce a second sampled signal, the second adaptive filter being connected to receive the second sampled signal.

15. The receiver front end of claim 14 wherein the second adaptive filter comprises a digital filter.

16. The receiver front end of claim 14 further comprising
a first low pass filter filtering the first received signal before the first analog-to-digital converter samples the first received signal, and
a second low pass filter filtering the second received signal before the second analog-to-digital converter samples the second received signal.

17. The receiver front end of claim 8 wherein the first adaptive filter comprises a linear filter.

18. The receiver front end of claim 17 wherein the second adaptive filter comprises a linear filter.

19. The receiver front end of claim 8 wherein said first and second adaptive filters are each adaptively adjusted to remove amplitude variations from the combined signal.

20. The receiver front end of claim 8 further comprising a control processor connected to said first adaptive filter, the control processor controlling a rate at which said first adaptive filter adapts to the first received signal.

21. The receiver front end of claim 20 wherein said processor is connected to detect a change in power of said first received signal, said processor causing said first adaptive filter to change said rate in response to said change.

22. The receiver front end of claim 20 wherein said processor is connected to detect a second received signal occupying a frequency band adjacent to said first-mentioned received signal, said processor causing said first adaptive filter to change said rate in response to a difference in amplitude of the first received signal and the second received signal.

23. A receiver from end for reducing multipath fading comprising:

a first input line receiving a first received signal from a first antenna, said first received signal representing a transmit signal that has passed through a first channel characterized by a first frequency response;

a first filter circuit receiving the first received signal and producing a first filtered signal therefrom, said first filter circuit comprising
a downconverter downconverting the first received signal to produce a first baseband signal,
a low pass filter receiving the first baseband signal to produce a first filtered signal,
an analog-to-digital converter digitizing the first filtered signal to produce a series of samples, and
a first adaptive filter receiving the series of samples, the first adaptive filter characterized by an inverse first channel frequency response approximating an inverse of a baseband equivalent of the first channel frequency response;

a second input line for receiving a second received signal from a second antenna, said second received signal representing the transmit signal after it has passed through a second channel characterize by a second channel frequency response;

a second filter circuit receiving the second received signal and producing a second filtered signal therefrom, said second filter circuit comprising
a second downconverter downconverting the second received signal to produce a second baseband signal,
a second low pass filter receiving the second baseband signal to produce a second filtered signal,
a second analog-to-digital converter digitizing the second filtered signal to produce a second series of samples, and
a second adaptive filter receiving the second series of samples, the second adaptive filter characterized by an inverse second channel frequency response approximating an inverse of a baseband equivalent of the second channel frequency response;

a combiner circuit summing the first and second filtered signals to generate a combined signal, wherein the first and second adaptive filters each contain adjusting means for adaptively adjusting the first and second adaptive filters in response to the combined signal to achieve a combined signal having a predetermined characteristic.

24. A method for reducing multipath fading in a receiver that receives a transmitted signal, said method comprising:
receiving the transmitted signal through a first antenna to generate a first received signal;
receiving the transmitted signal through a second antenna to generate a second received signal;
downconverting the first received signal to produce a first shifted signal;
low pass filtering the first shifted signal to produce a first filtered signal;
digitizing the first filtered signal to produce a first series of samples;
adaptively filtering the first series of samples;
downconverting the second received signal to produce a second shifted signal;
low pass filtering the second shifted signal to produce a second filtered signal,
digitizing the second filtered signal to produce a second series of samples;

adaptively filtering the second series of samples;

after adaptively filtering the first and second series of samples, combining the first and second series of samples to produce a combined signal; and using the combined signal to control the adaptive filtering of both the first and second series of samples.

25. A receiver front end for reducing multipath fading comprising:

a receiver front end for reducing multipath fading comprising:

a first input line receiving a first received signal from a first antenna, said first received signal representing a transmit signal that has passed through a first channel;

a first filter circuit receiving the first received signal and producing a first filtered signal therefrom, said first filter circuit comprising a downconverter downconverting the first received signal to produce a first baseband signal, a low pass filter receiving the first baseband signal to produce a first filtered signal, an analog-to-digital converter digitizing the first filtered signal to produce a series of samples, and a first adaptive filter receiving the series of samples, the first adaptive filter approximating an inverse of a baseband equivalent of the first channel;

a second input line for receiving a second received signal from a second antenna, said second received signal representing the transmit signal after it has passed through a second channel;

a second filter circuit receiving the second received signal and producing a second filtered signal therefrom, said second filter circuit comprising a second downconverter downconverting the second received signal to produce a second baseband signal, a second low pass filter receiving the second baseband signal to produce a second filtered signal, a second analog-to-digital converter digitizing the second shifted signal to produce a second series of samples, and a second adaptive filter receiving the second series of samples, the second adaptive filter approximating an inverse of a baseband equivalent of the second channel;

a combiner circuit summing the first and second filtered signals to generate a combined signal, wherein the first and second adaptive filters are each adaptively adjusted to achieve a combined signal having a predetermined characteristic, wherein each downconverter comprises a complex downconverter that provides in-phase and quadrature components centered at a predetermined baseband frequency, each of said low pass filters comprises in-phase and quadrature low pass filters that provide low-pass filtered in-phase and quadrature signals respectively, each of said adaptive filters have in-phase and quadrature inputs coupled to the in-phase and quadrature low pass falters by in-phase and quadrature analog-to-digital converters respectively, and in-phase and quadrature feedback inputs, and in-phase and quadrature outputs, said combiner circuit comprises in-phase and quadrature summers with the in-phase summer having first and second inputs coupled to the in-phase outputs of the first and second adaptive filters respectively, the quadrature summer having first and second inputs coupled to the quadrature outputs of the first and second adaptive filters respectively, the output of the in-phase summer connected to the in-phase feedback inputs of the first and second adaptive filters, and the output of the quadrature summer coupled to the quadrature feedback inputs of the first and second adaptive filters.

26. A receiver front end for reducing multipath fading in accordance with claim 25 and further comprising, a demodulator having in-phase and quadrature inputs coupled to the outputs of said in-phase and quadrature summers respectively, a stereo multiplex decoder having an input coupled to the output of said demodulator and first and second digital outputs, and first and second digital-to-analog converters coupled to the first and second outputs of said stereo multiplex decoder for providing first and second analog signals carried by said transmit signal.

\* \* \* \* \*